United States Patent
Hayashi et al.

(10) Patent No.: US 11,130,872 B2
(45) Date of Patent: Sep. 28, 2021

(54) RED PAINT FOR CERAMIC DECORATION

(71) Applicant: NORITAKE CO., LIMITED, Aichi (JP)

(72) Inventors: Hiromichi Hayashi, Aichi (JP); Jun Shiota, Aichi (JP); Tomoshi Kumazawa, Aichi (JP)

(73) Assignee: Noritake Co., Limited, Nagoya (JP)

(*) Notice: Subject to any disclaimer, the term of this patent is extended or adjusted under 35 U.S.C. 154(b) by 241 days.

(21) Appl. No.: 16/088,594

(22) PCT Filed: Mar. 17, 2017

(86) PCT No.: PCT/JP2017/010934
§ 371 (c)(1),
(2) Date: Sep. 26, 2018

(87) PCT Pub. No.: WO2017/169905
PCT Pub. Date: Oct. 5, 2017

(65) Prior Publication Data
US 2019/0112490 A1    Apr. 18, 2019

(30) Foreign Application Priority Data
Mar. 30, 2016   (JP) .............................. JP2016-068160

(51) Int. Cl.
*C09D 5/06*    (2006.01)
*C04B 41/86*   (2006.01)
*C03C 8/18*    (2006.01)
*C09D 1/00*    (2006.01)
(Continued)

(52) U.S. Cl.
CPC ............... *C09D 5/06* (2013.01); *C03C 3/087* (2013.01); *C03C 8/04* (2013.01); *C03C 8/14* (2013.01); *C03C 8/18* (2013.01); *C03C 14/004* (2013.01); *C04B 41/009* (2013.01); *C04B 41/5022* (2013.01); *C04B 41/86* (2013.01); *C09D 1/00* (2013.01); *C09D 5/004* (2013.01); *C09D 7/62* (2018.01); *C09D 7/67* (2018.01);
(Continued)

(58) Field of Classification Search
None
See application file for complete search history.

(56) References Cited

U.S. PATENT DOCUMENTS 5,679,466 A      10/1997  Noguchi et al.
8,932,514 B1 *    1/2015  Yin ........................ B32B 7/12
                                                          264/603

(Continued)

FOREIGN PATENT DOCUMENTS

CN    101116910 A    2/2008
CN    101203298 A    6/2008
(Continued)

OTHER PUBLICATIONS

CN-101767936-A—english translation (Year: 2010).*
Chinese Office Action in CN Application No. 201780020431.6.
The Search Report in ES201890054.

*Primary Examiner* — Stefanie J Cohen
(74) *Attorney, Agent, or Firm* — Occhiuti & Rohlicek LLP

(57) ABSTRACT

The present invention provides a red paint for ceramic decoration, including a glass matrix, and a red colorant and a protective material that are intermingled in the glass matrix. The red colorant contains gold nanoparticles and silver nanoparticles. The protective material contains silica nanoparticles.

18 Claims, 2 Drawing Sheets

|  | | Ag (vol%) | | | | | | |
|---|---|---|---|---|---|---|---|---|
|  | | 0 | 0.05 | 0.09 | 0.11 | 0.16 | 0.22 | 0.32 | 0.45 |
| Au (vol%) | 0 |  |  |  | REFERENCE EXAMPLE 1 L=85.0 a=1.1 b=25.0 |  | REFERENCE EXAMPLE 2 L=73.5 a=1.9 b=50.1 |  |  |
|  | 0.05 |  |  | EXAMPLE 2 L=66.2 a=20.5 b=18.3 |  |  |  |  |  |
|  | 0.11 |  | EXAMPLE 3 L=58.1 a=32.9 b=15.8 |  | EXAMPLE 4 L=52.2 a=33.8 b=24.3 |  |  |  |  |
|  | 0.22 |  |  |  |  | EXAMPLE 5 L=42.9 a=41.4 b=28.3 |  |  |  |
|  | 0.28 |  | REFERENCE EXAMPLE 3 L=40.5 a=46.3 b=4.8 |  | EXAMPLE 6 L=43.9 a=46.3 b=25.8 |  | EXAMPLE 7 L=39.6 a=46.9 b=35.3 |  |  |
|  | 0.32 |  |  |  |  |  |  | EXAMPLE 8 L=37.6 a=46.4 b=37.3 |  |
|  | 0.60 |  |  |  |  |  |  |  | EXAMPLE 1 L=30.2 a=43.3 b=34.9 |

(51) Int. Cl.
  *C09D 5/33* (2006.01)
  *C04B 41/50* (2006.01)
  *C09D 7/40* (2018.01)
  *C03C 8/04* (2006.01)
  *C03C 8/14* (2006.01)
  *C04B 41/00* (2006.01)
  *C03C 3/087* (2006.01)
  *C09D 7/62* (2018.01)
  *C03C 14/00* (2006.01)
  *C08K 3/08* (2006.01)
  *C08K 3/36* (2006.01)
  *C04B 111/82* (2006.01)

(52) U.S. Cl.
  CPC .............. *C04B 2111/82* (2013.01); *C08K 3/36* (2013.01); *C08K 2003/0806* (2013.01); *C08K 2003/0831* (2013.01)

(56) References Cited

U.S. PATENT DOCUMENTS

| | | | |
|---|---|---|---|
| 2008/0026207 A1 | 1/2008 | Fink-Petri et al. | |
| 2008/0090034 A1* | 4/2008 | Harrison | C03C 4/02 428/32.71 |
| 2010/0059726 A1* | 3/2010 | Jung | B82Y 30/00 252/582 |
| 2011/0256412 A1 | 10/2011 | Katoh et al. | |
| 2015/0175807 A1 | 6/2015 | Jing et al. | |

FOREIGN PATENT DOCUMENTS

| | | | |
|---|---|---|---|
| CN | 101675118 A | | 3/2010 |
| CN | 101767936 A | * | 7/2010 |
| DE | 4337648 A1 | | 5/1995 |
| EP | 0 598 472 | | 5/1994 |
| EP | 2 674 449 | | 12/2013 |
| JP | 6-24796 | | 2/1994 |
| JP | 6-115973 | | 4/1994 |
| JP | 2000-103012 | | 4/2000 |
| JP | 2002-173384 | | 6/2002 |
| JP | 2007-63530 | | 3/2007 |
| JP | 2011-225909 | | 11/2011 |
| JP | 2013-23735 | | 2/2013 |
| JP | 2015-526275 | | 9/2015 |
| WO | 2006126771 A1 | | 11/2006 |
| WO | 2008122420 A1 | | 10/2008 |

* cited by examiner

FIG.2

| | | Ag (vol%) | | | | | | | |
|---|---|---|---|---|---|---|---|---|---|
| | | 0 | 0.05 | 0.09 | 0.11 | 0.16 | 0.22 | 0.32 | 0.45 |
| Au (vol%) | 0 | | | | REFERENCE EXAMPLE 1 L=85.0 a=1.1 b=25.0 | | REFERENCE EXAMPLE 2 L=73.5 a=1.9 b=50.1 | | |
| | 0.05 | | | EXAMPLE 2 L=66.2 a=20.5 b=18.3 | | | | | |
| | 0.11 | | EXAMPLE 3 L=58.1 a=32.9 b=15.8 | | EXAMPLE 4 L=52.2, a=33.8, b=24.3 | | | | |
| | 0.22 | | | | | EXAMPLE 5 L=42.9, a=41.4, b=28.3 | | | |
| | 0.28 | REFERENCE EXAMPLE 3 L=40.5, a=46.3, b=4.8 | | | EXAMPLE 6 L=43.9, a=46.3, b=25.8 | | EXAMPLE 7 L=39.6, a=46.9, b=35.3 | | |
| | 0.32 | | | | | | | EXAMPLE 8 L=37.6, a=46.4, b=37.3 | |
| | 0.60 | | | | | | | | EXAMPLE 1 L=30.2 a=43.3 b=34.9 |

RED PAINT FOR CERAMIC DECORATION

CROSS REFERENCE TO RELATED APPLICATIONS

This application is a National Stage of International Application No. PCT/JP2017/010934 filed on Mar. 17, 2017, which claims priority to Japanese Application No. 2016-068160 filed on Mar. 30, 2016, the contents of which are hereby incorporated by reference in their entirety.

TECHNICAL FIELD

The present invention relates to a red paint for ceramic decoration. More particularly, the present invention relates to a red paint containing nanogold (Au) particles and nanosilver (Ag) particles as a red colorant.

The present application claims priority based on Japanese Patent Application No. 2016-068160, filed on Mar. 30, 2016, the entire contents of which are incorporated herein by reference.

BACKGROUND ART

A production example of ceramics typified by chinaware, tiles and the like involves firstly kneading and molding prepared earths such as kaolin, silica sand, and feldspar, as starting materials, followed by drying and baking to produce a substrate. Then a glaze or paint is applied to the surface of the substrate, and decoration firing is performed. As a result, a decorated ceramic having a color or pattern burnt onto the surface thereof can be obtained.

Red is a highly demanded color in ceramic decoration, by virtue of being associated with national flags, corporate logos, characters, Christmas and so forth. Cadmium-based materials such as selenium-cadmium red have been widely used conventionally as red colorants contained in red paints, since such materials afford a vivid red coloration. There is a trend however towards restricting the use of selenium-cadmium red, due to the toxicity of cadmium.

CITATION LIST

Patent Literature

Patent Literature 1: Japanese Patent Application Publication No. 2013-023735

SUMMARY OF INVENTION

In view of the above considerations, it is an object of the present invention to provide a red paint for ceramic decoration (painting) that affords for a vivid red coloration.

The present invention provides a red paint for ceramic decoration, including a glass matrix, and a red colorant and a protective material that are intermingled in the glass matrix. The red colorant contains gold nanoparticles and silver nanoparticles. The protective material contains silica nanoparticles.

The gold nanoparticles elicit a bluish red (red-purple) coloration, referred to as "maroon", upon absorption of green to light-blue light. The silver nanoparticles afford a yellow coloration through absorption of blue light. Accordingly, the concomitant use of gold nanoparticles and silver nanoparticles as a red colorant allows the silver nanoparticles to absorb the blue light in the "maroon" derived from the gold nanoparticles. A vivid red coloration can be achieved as a result. Further, dispersing the red colorant in the glass matrix together with the protective material makes the red colorant less likely to penetrate into the glass matrix during decoration firing, and allows achieving stably a crisply tinged red coloration.

Unless otherwise stated, the term "nanoparticles" in the present specification denotes particles having an arithmetic mean value (D50 particle size) of 1 to 100 nm of an equivalent circle diameter based on an electron microscopy, for instance a transmission electron microscope (TEM).

Unless otherwise stated, the term "ceramic" in the present specification denotes nonmetallic inorganic materials in general. For instance chinaware materials, glass materials and so forth are typical examples encompassed within the term ceramics in the present specification.

Patent Literature 1 discloses a red glaze containing copper nanoparticles. In Patent Literature 1, a red coloration is achieved through decoration firing of the above red glaze in an oxidizing atmosphere. However, not a little copper oxide (II) is generated, through oxidation of copper, when the copper nanoparticles disclosed in Patent Literature 1 are fired in an oxidizing atmosphere (for instance an air atmosphere). When using the above red glaze, therefore, a red decorative portion takes on dark, dull color tone derived from insufficient brightness or insufficient yellow tinge (for instance, L* value and b* value in the L*a*b* color system). Therefore, the above the red glaze failed to become an alternative of for instance selenium-cadmium red, which affords a vivid red.

In a preferred embodiment of the red paint disclosed herein, the volume ratio of the gold nanoparticles and the silver nanoparticles satisfies gold nanoparticles:silver nanoparticles=80:20 to 20:80. As a result the effect of using concomitantly gold nanoparticles and silver nanoparticles can be brought out to a higher level, and a vivid red coloration can be achieved yet more stably.

In a preferred embodiment of the red paint disclosed herein, the proportion of the gold nanoparticles is 0.05 parts by volume to 0.5 parts by volume with respect to 100 parts by volume as the total of the glass matrix and the protective material. The a* value in the red direction in the L*a*b* increases as a result, and red color development can be enhanced thereby. Further, the brightness L* value in the L*a*b* color system increases, and there can be suitably achieved a bright vivid tinge. Moreover, costs can be kept low by preventing the red paint from becoming excessively expensive.

In a preferred embodiment of the red paint disclosed herein, the proportion of the silver nanoparticles is 0.05 parts by volume to 0.4 parts by volume with respect to 100 parts by volume as the total of the glass matrix and the protective material. As a result there increases the b* value in the yellow direction, in the L*a*b* color system, which allows suppressing bluishness in the gold nanoparticles at a high level. A yet sharper red color development can therefore be achieved. Moreover, costs can be kept low by preventing the red paint from becoming excessively expensive.

In a preferred embodiment of the red paint disclosed herein, the volume of the protective material is 20 times or more the volume of the red colorant. As a result, this renders penetration of the red colorant into the glass matrix during decoration firing yet unlikelier, and red fading is better suppressed. Excellent red color development can be realized as a result at a yet higher level.

In a preferred embodiment of the red paint disclosed herein, the proportion of the protective material is 10 vol % to 40 vol % with respect to 100 vol % as the total of the glass matrix and the protective material. In addition to red color development, a red decorative portion of high specular glossiness and of appearance excellent in gloss feeling can be achieved as a result.

In another aspect the present invention provides also a ceramic product having a red decorative portion. The red decorative portion contains glass, gold and silver. The red decorative portion satisfies the following conditions in the L*a*b* color system, based on Japanese Industrial Standards JIS Z8729 (2004): the L* value is 35 to 70; the a* value is 20 or greater; and the b* value is 15 or greater. In one preferred embodiment, a 45-degree specular glossiness of the red decorative portion based on Japanese Industrial Standards JIS Z8741 (1997) is 70% or higher.

BRIEF DESCRIPTION OF DRAWINGS

FIG. 2 is a matrix denoting the relationship between the content ratio of red colorant and brightness and chromaticity in the L*a*b* color system.

DESCRIPTION OF EMBODIMENTS

Figure 1:
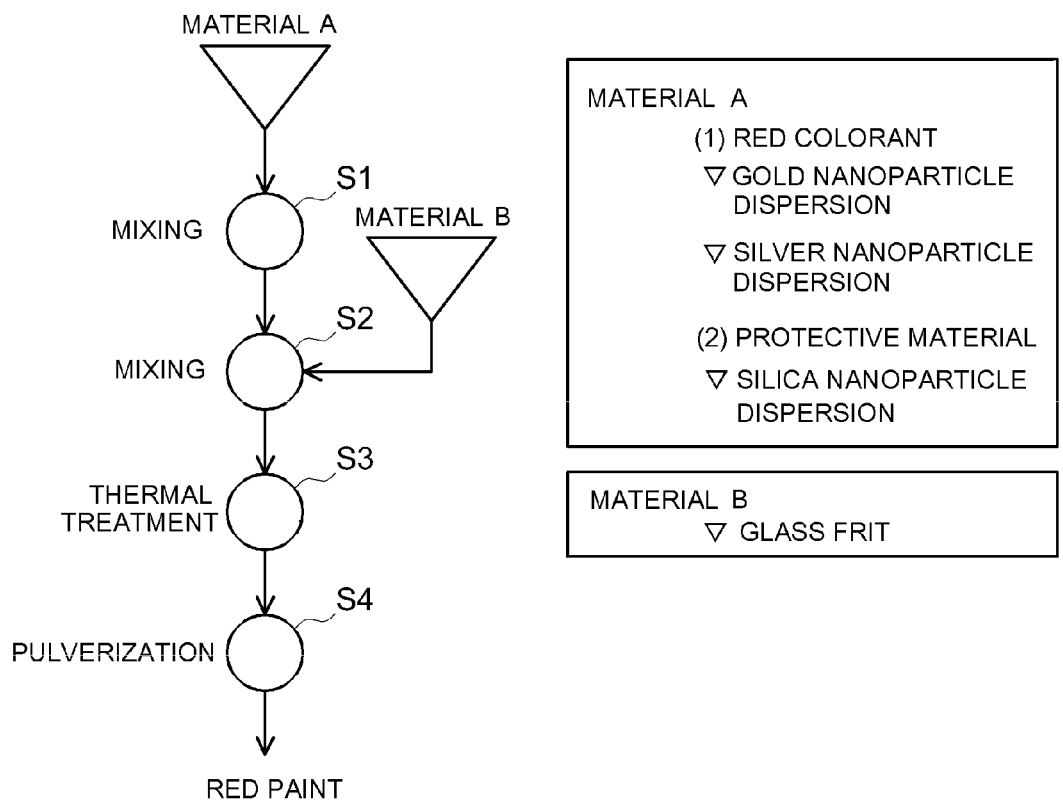
FIG. 1 is a flowchart for explaining a method for producing a red paint according to an embodiment of the present invention.

Preferred embodiments of the present invention will be explained below. Any features other than the features specifically set forth in the present description and which may be necessary for carrying out the present invention can be regarded as instances of design matter, for a person skilled in the art, based on conventional techniques in the technical field in question. The present invention can be realized on the basis of the disclosure of the present specification and common technical knowledge in the relevant technical field. In the present specification a numerical value range notated as A to B (where A and B are arbitrary numerical values) denotes a value equal to or larger than A and equal to or smaller than B.

<<Red Paint>>

The red paint disclosed herein is a red paint for forming a red decorative portion in a ceramic, as an object to be decorated, by coating the surface of the ceramic with the red paint and by performing then decoration firing. The red paint has a glass matrix, and a red colorant and a protective material dispersed in the glass matrix, wherein the red colorant contains nanogold (Au) particles and nanosilver (Ag) particles, and the protective material contains silica nanoparticles. Other properties are therefore not particularly limited, and can be arbitrary established in the light of various criteria, for instance through addition of various components and modification of the compositions thereof. The various constituent components will be explained next in order.

The glass matrix has matrix properties of dispersing the red colorant and the protective material. The red colorant and the protective material are intermingled in the glass matrix. The glass component, the red colorant component and the protective material component are typically in the form of a sintered compact resulting from integral sintering of the foregoing.

The glass matrix is a component functioning as an inorganic binder of the red colorant. The glass matrix has also the function of enhancing bonding between the red colorant and the ceramic being the object to be decorated. The coefficient of linear thermal expansion (average coefficient of linear expansion measured in a temperature region from 25° C. to 500° C. using a thermomechanical analyzer; likewise hereafter) of the glass that makes up the glass matrix is not particularly limited, and may be identical to that of the ceramic as the object to be decorated. As an example, the coefficient of linear thermal expansion of the glass may be about (coefficient of thermal expansion of the object to be decorated) $\pm 2\times 10^{-6} K^{-1}$. The coefficient of linear thermal expansion of the glass can lie for instance in the range of $4.0\times 10^{-6} K^{-1}$ to $8.0\times 10^{-6} K^{-1}$. As a result the difference between the shrinkage factors of the object to be decorated (ceramic) and of the red paint at the time of decoration firing becomes smaller, and the occurrence of peeling, cracking and so forth at the site decorated with the red colorant becomes unlikelier.

The glass transition point (Tg value based on differential scanning calorimetry; likewise hereafter) of the glass that makes up the glass matrix is not particularly limited. For instance, the glass transition point may be of about 400° C. to 1500° C., on the basis of the below-described relationship with respect to sintering temperature. Within the above range, the glass transition point may be about 900° C. to 1300° C. in underglaze decoration applications and sink-in applications. The glass transition point in overglaze decoration applications may be about 500° C. to 900° C.

Examples of glass types that can have such properties (coefficient of thermal expansion and glass transition point) include for instance $SiO_2$—RO glass (where RO represents an oxide of a group II element, for instance MgO, CaO, SrO and BaO; likewise hereafter), $SiO_2$—RO—$R_2O$ glass (where $R_2O$ represents an oxide of an alkali metal element, for instance $Li_2O$, $Na_2O$, $K_2O$, $Rb_2O$, $Cs_2O$ and $Fr_2O$, in particular $Li_2O$; likewise hereafter), $SiO_2$—RO—ZnO glass, $SiO_2$—RO—$ZrO_2$ glass, $SiO_2$—RO—$Al_2O_3$ glass, $SiO_2$—RO—$Bi_2O_3$ glass, $SiO_2$—$R_2O$ glass, $SiO_2$—ZnO glass, $SiO_2$—$ZrO_2$ glass, $SiO_2$—$Al_2O_3$ glass, RO—$R_2O$ glass, RO—ZnO glass or the like. The foregoing types of glass may contain one, or two or more components in addition to the main constituent components given in the above denomination. The glass may be ordinary amorphous glass, or crystal-containing crystallized glass.

In a preferred embodiment, $SiO_2$ is half (50 mol %) or more with respect to 100 mol % as the whole glass. The glass transition point tends generally to increase with rising proportion of $SiO_2$. Accordingly, the proportion of $SiO_2$ may be kept at or below about 80 mol % in the case for instance where the below-described sintering temperature is set to be low.

Adding components such as RO, $R_2O$, and $B_2O_3$ is effective from the viewpoint of lowering the glass transition point and thereby enhancing the meltability of the glass. By contrast, the coefficient of thermal expansion of the glass tends to become higher with increasing content of the foregoing components. In a preferred embodiment, RO is about 15 to 35 mol % with respect to 100 mol % as the whole glass. In another preferred embodiment, $R_2O$ is 0 to 5 mol % with respect to 100 mol % as the whole glass.

In a preferred embodiment, the glass is made up of a multi-component system of four or more components (for instance, five or more components). The physical stability of the red decorative portion is enhanced as a result. In applications that involve for instance decoration of tableware, the red decorative portion is required to exhibit sufficient acid resistance towards acidic foods and sufficient alkali resistance towards alkaline detergents. In these cases, it is effective to add for instance a component such as $Al_2O_3$, ZnO, and CaO, for instance in a proportion of 1 mol % or higher, in addition to the main constituent components given in the above denomination. The chemical durability of the red decorative portion can be better enhanced as a result. Wear resistance as well can be preferably enhanced.

In a preferred embodiment, the glass contains substantially no component that may adversely impact human health or the environment, for instance arsenic components, lead components or cadmium components. In applications of tableware decoration, in particular, it is preferable not to actively add any such components (which may however be permissibly mixed into the glass as unavoidable impurities).

The proportion of the glass matrix in the red paint is not particularly limited. The proportion of the glass matrix is about 50 vol % or higher, typically 60 vol % or higher and for instance 70 vol % or higher, with respect to 100 vol % as the whole red paint, from the viewpoint of enhancing bonding with the ceramic, being the object to be decorated. The proportion of the glass matrix is about 95 vol % or lower, typically 90 vol % or lower, and for instance 80 vol % or lower, with respect to 100 vol % as the whole red paint, from the viewpoint of enhancing red color development. For identical reasons the proportion of the glass matrix is about 50 vol % or higher, typically 60 vol % or higher, and instance 70 vol % or higher, and is about 95 vol % or lower, typically 90 vol % or lower, and for instance 80 vol % or lower, with respect to 100 vol % as the total of the glass matrix and the protective material.

The red colorant is a component that imparts red color to the surface of the ceramic being the object to be decorated. The red colorant is intermingled with the protective material in the glass matrix. The red colorant and the protective material may be present independently from each other, or may be present as clumps resulting from aggregation of the protective material around the red colorant. The red colorant contains gold nanoparticles and silver nanoparticles as metal nanoparticles.

The metal nanoparticles exhibit specific optical features (for instance strong light absorption bands) in the ultraviolet to visible regions, arising from surface plasmon resonance (SPR). For instance nanogold (Au) particles absorb light of a wavelength in the vicinity of 530 nm (green light to light-blue light) and exhibit a bluefish red (red-purple) coloration referred to as "maroon". For instance nanosilver (Ag) particles absorb light (blue light) at a wavelength in the vicinity of 420 nm and exhibit yellow coloration. Through the concomitantly use of gold nanoparticles and silver nanoparticles, accordingly, the bluish wavelength of gold nanoparticles is absorbed by the silver nanoparticles, and a vivid red coloration is brought about thereby. The gold nanoparticles and the silver nanoparticles may be in the form of respective single particles, or may be in an alloyed state. So long as the effect of the technology disclosed herein is not significantly impaired thereby, the red colorant may include metal nanoparticles other than gold and silver, for instance at a volume proportion no greater than $\frac{1}{10}$ of the total volume of gold nanoparticles and silver nanoparticles.

The D50 particle size of the gold nanoparticles and the silver nanoparticles is a nanometer size (about 1 to 100 nm), in terms of a trade-off with the above surface plasmon resonance. The surface plasmon resonance effect of metal nanoparticles can vary depending on particle size. The surface plasmon resonance effect can be better exploited through proper adjustment of particle size to a nanometer size.

In a preferred embodiment, each of the D50 particle size of the gold nanoparticles and silver nanoparticles is 5 nm or greater, typically 10 nm or greater and for instance 15 nm or greater. In another preferred embodiment, each of the D50 particle size of the gold nanoparticles and silver nanoparticles is about 80 nm or smaller, typically 50 nm or smaller, and for instance 30 nm or smaller. By prescribing the D50 particle size to lie within the above ranges allows increasing absorbance at the specific wavelengths of the metal nanoparticles, while achieving good red coloration with small addition amounts. Further, precise decoration can be realized, with little color unevenness.

The mixing ratio of the gold nanoparticles and silver nanoparticles is affected also for instance by the particle size and particle size distribution of the metal nanoparticles, and accordingly is not particularly limited. For instance, the volume ratio may be set so that the volume of the gold nanoparticles is greater, or so that the volume of silver nanoparticles is greater. In a preferred embodiment, the volume ratio of gold nanoparticles and silver nanoparticles satisfies gold nanoparticles:silver nanoparticles=80:20 to 20:80, for instance gold nanoparticles:silver nanoparticles=72:28 to 36:64. The effect of the technology disclosed herein can be brought out at a high level as a result, and a vivid red coloration can be realized yet more stably.

The proportion of the red colorant in the red paint is not particularly limited. The proportion of red colorant is about 0.1 vol % or higher, for instance 0.15 vol % or higher, and is about 1 vol % or lower, typically 0.8 vol % or lower, and for instance 0.7 vol % or lower, with respect to 100 vol % as the whole red paint, for instance from the viewpoint of enhancing red color development and in terms of cost. For identical reasons, the proportion of red colorant may be about 0.1 parts by volume or more, for instance 0.15 parts by volume or more, and may be about 1 part by volume or less, typically 0.8 parts by volume or less and for instance 0.7 parts by volume or less, with respect to 100 parts by volume as the total of the glass matrix and the protective material.

In a preferred embodiment, the volume of the red colorant is about $\frac{1}{100}$ to $\frac{1}{200}$, for instance $\frac{1}{120}$ to $\frac{1}{180}$, of the volume of the glass matrix. A homogeneous red coloration can be achieved stably as a result.

In a preferred embodiment, the proportion of gold nanoparticles is about 0.05 parts by volume or more, preferably 0.1 parts by volume or more, and for instance 0.11 parts by volume or more, with respect to 100 parts by volume as the total of the glass matrix and the protective material. By prescribing the proportion of gold nanoparticles to be equal to or greater than a predetermined value it becomes possible to increase the a* value in the red direction, in the L*a*b* color system, and to enhance thus red color development. Further, the brightness L* value can also be increased, and a bright vivid tinge can be better achieved.

In another preferred embodiment, the proportion of gold nanoparticles is about 0.5 parts by volume or less, typically 0.45 parts by volume or less, preferably 0.35 parts by volume or less, and for instance 0.32 parts by volume or less, with respect to 100 parts by volume as the total of the glass matrix and the protective material. By prescribing the proportion of gold nanoparticles to be equal to or smaller than a predetermined value it becomes possible to increase the brightness L* value in the L*a*b* color system, and to better realize a bright vivid tinge. Costs can moreover be kept low.

In a preferred embodiment, the proportion of silver nanoparticles is about 0.05 parts by volume or more, preferably 0.1 parts by volume or more, and for instance 0.11 parts by volume or more, with respect to 100 parts by volume as the total of the glass matrix and the protective material. By prescribing the proportion of silver nanoparticles to be equal to or greater than a predetermined value it becomes possible to increase the b* value in the yellow direction, in the L*a*b* color system, and to achieve yet superior red color development.

In another preferred embodiment, the proportion of silver nanoparticles is about 0.4 parts by volume or less, preferably 0.35 parts by volume or less, and for instance 0.32 parts by volume or less, with respect to 100 parts by volume as the total of the glass matrix and the protective material. By prescribing the proportion of silver nanoparticles to be equal to or smaller than a predetermined value it becomes possible to increase the brightness L* value in the L*a*b* color system, and to better realize a bright vivid tinge. Costs can moreover be kept low.

The protective material is a component for suppressing fading of the red colorant during decoration firing and for enhancing red color development. Specifically, the protective material has a higher melting point than a below-described decoration firing temperature. As a result the red colorant (nanometal) and glass do not come readily into contact with each other during decoration firing, thanks to the fact that the red paint contains the protective material. In consequence it becomes possible to prevent the red colorant from being taken up as a constituent component of the glass, in other words, to suppress dissolution of the red colorant in the glass. The state in which the red colorant is dispersed in the glass in the form of metal particles, also after decoration firing, can be maintained stably as a result. Therefore a crisply tinged red coloration can be achieved that boasts excellent color development. The protective material is intermingled with the red colorant in the glass matrix. The protective material may be in a state separate from that of the red colorant, or may be for instance adhered to, bonded to or coordinated with the surface of the red colorant.

The protective material contains silica nanoparticles. The transparency of silica increases when sintered. An effect is elicited as a result of accentuating color development in the red decorative portion, and reinforcing a gloss feeling. Further, silica is commercially available at a comparatively low expense, and accordingly is preferable in terms of availability and cost. So long as the effect of the technology disclosed herein is not significantly impaired thereby, the protective material may contain ceramic nanoparticles other than silica nanoparticles, for instance at a volume proportion lower than that of the silica nanoparticles. Concrete examples thereof include for instance zirconia nanoparticles, alumina nanoparticles and titania nanoparticles.

The D50 particle size of the protective material is of nanometer size (about 1 to 100 nm). The D50 particle size of the protective material (typically silica nanoparticles) is typically identical to, or smaller than, the D50 particle size of the metal nanoparticles. In a preferred embodiment, the D50 particle size of the protective material is about 50 nm or smaller, typically 30 nm or smaller and for instance 20 nm or smaller. By prescribing the D50 particle size to be equal to or smaller than a predetermined value, the specific surface area of the particle size increases, and there is better elicited the effect of suppressing fading of the red colorant during decoration firing. It becomes therefore possible to achieve a superior red coloration yet more stably.

In a preferred embodiment, the volume of the protective material is about 5 times or more, typically 10 times or more, preferably 20 times or more, for instance 30 times or more the volume of the red colorant. The effect of suppressing fading of the red colorant during decoration firing can be better brought out as a result.

In another preferred embodiment, the volume of the protective material is about 90 times or less, typically 80 times or less, preferably 70 times or less, for instance 60 times or less, and more preferably 50 times or less the volume of the red colorant. As a result there can be realized a red decorative portion of better enhanced appearance (gloss feeling, glow, and color tone).

The proportion of the protective material in the red paint is not particularly limited. The proportion of the protective material may be about 10 vol % or higher, for instance 20 vol % or higher, with respect to 100 vol % as the whole red paint, from the viewpoint of enhancing red color development. The proportion of the protective material may be about 40 vol % or lower, for instance 30 vol % or lower, with respect to 100 vol % of the whole red paint, from the viewpoint of enhancing gloss feeling or glow. For similar reasons, the proportion of the protective material may be about 10 vol % or higher, for instance 20 vol % or higher, and may be about 40 vol % or lower, for instance 30 vol % or lower, with respect to 100 vol % as the total of the glass matrix and the protective material.

The red paint disclosed herein may be made up of the above three components (glass, red colorant and protective material), or may have added thereto other components, as appropriate, for instance within a range of less than about 10 vol %, with respect to 100 vol % as the whole red paint, so long as the effect of the technology disclosed herein is not significantly impaired in doing so. Examples of additional components include for instance organic binders, reaction accelerators, surfactants, dispersants, thickeners, pH adjusters, preservatives, antifoaming agents, plasticizers, stabilizers, antioxidants and the like. In a preferred embodiment, the red paint contains substantially no component that may adversely impact human health or the environment, for instance arsenic components, lead components or cadmium components (which may however be permissibly mixed into the red paint as unavoidable impurities). In applications of tableware decoration, in particular, it is preferable that the red paint contains no such components.

The red paint disclosed herein can be adjusted in various ways depending on the intended application. For instance, the red paint can be prepared in cullet form, powder form, frit form, pellet form, plate form or paste form. As an example in a case for instance where fine decoration is to be imparted to the surface of the object to be decorated, the red paint may be prepared as a paste form through addition of a solvent (for instance an aqueous solvent) to the red paint.

<<Method for Producing the Red Paint>>

The method for producing such a red paint is not particularly limited, and for instance may involve adding glass frit to a mixture of the red colorant and the protective material, with further mixing, drying and integral sintering, followed by pulverization, to thereby produce the red paint. The various steps will be explained next with reference to the flowchart in FIG. 1.

The production method illustrated in FIG. 1 includes the following steps: (step S1) preparing a liquid first mixture through mixing of a red colorant and a protective material in accordance with a wet method; (step S2) mixing glass frit into the first mixture, to prepare a second mixture; (step S3) subjecting the second mixture to a thermal treatment, to thereby yield a sintered compact in which the red colorant and the protective material are intermingled in the glass matrix; and (step S4) pulverizing the sintered compact. This production method allows producing a red paint of the present embodiment in simple steps, i.e. mixing and a thermal treatment. Therefore, the above production method is preferable in terms of convenience, workability and mass productivity as compared with for instance a production method that requires a step of forming a silica coating film on the surface of metal nanoparticles.

In step S1 the red colorant and the protective material are mixed. At least gold nanoparticles and silver nanoparticles are prepared as the red colorant. At least silica nanoparticles are prepared as the protective material. Nanoparticles have high cohesiveness, and hence are typically commercially available in the form of dispersions in which the particles have been stabilized in a dispersion solvent. In the present embodiment, therefore, respective nanoparticle dispersions are weighed and mixed in such a manner that gold nanoparticles, silver nanoparticles and silica nanoparticles obey predetermined volume ratios. The affinity of the red colorant and the protective material can be increased by mixing the red colorant and the protective material beforehand, prior to addition of the glass frit. The mixing operation can be accomplished for instance using a magnetic stirrer or relying on ultrasonic waves. A liquid first mixture is thus prepared.

In step S2 glass frit is mixed, at a predetermined ratio, into the liquid first mixture. In the present embodiment a highly homogeneous mixture can be obtained through mixing of the first mixture and the glass frit in accordance with a wet method. A liquid second mixture is thus prepared.

In step S3 the second mixture is subjected to a thermal treatment. For instance, the second mixture is firstly dried at a temperature region not higher than 100° C., to remove the dispersion medium to a certain extent. The resulting mixture is next heated at a temperature equal to or higher than the glass transition point of the glass frit, to thereby integrally sinter the mixture. The sintering temperature may be set to lie in the range of about a glass transition point +0° C. to 300° C. In the production for instance of a paint for overglaze decoration the sintering temperature may be set to about 800° C. to 900° C., in a case where the glass transition point of the glass frit is 600° C. to 800° C. The sintering time may be ordinarily set to range from about 0.1 to several hours. The atmosphere resorted to at the time of sintering may be an air atmosphere, an oxidizing atmosphere, an inert gas atmosphere or the like. As a result of such a thermal treatment there is obtained an integral sintered compact in which the red colorant and the protective material are intermingled in the glass matrix.

In step S4 the sintered compact is pulverized (for instance crushed) and/or sorted to a desired size. The pulverization operation can be accomplished for instance using a vibration mill, a planetary mill, a stirring grinder or the like. The shape and size of the red paint are not particularly limited, and for instance the average particle size based on laser diffraction-light scattering may be set to about 10 μm or less, typically in the range of 0.1 to 10 μm, and for instance about 0.5 to 5 μm, for instance in terms of handleability.

The red paint thus obtained is used for decorating the surface of a ceramic as the object to be decorated. The decoration operation may be accomplished by applying the red paint onto the surface of a ceramic, followed by decoration firing at a predetermined temperature. For instance in "underglaze decoration", where decoration is imparted to a baked substrate, and in "sink-in" where the red paint is incorporated into a glaze, the red paint may be applied to the surface of a ceramic, followed by decoration firing at high temperature, of about 1200° C. to 1400° C. In "overglaze decoration", where decoration is imparted to a glazed substrate (after glazing), the red paint may be applied to the surface of the ceramic, followed by decoration firing at a medium temperature, of about 700° C. to 1000° C. The red paint of the present embodiment can yield particularly good red coloration through firing at the above medium temperature.

Decoration firing after application of the red paint can be carried out typically in an air atmosphere (oxidizing atmosphere). For instance cinnabar (cupric oxide) widely used as a red colorant requires decoration firing under a reducing atmosphere. By contrast, the red paint disclosed herein develops red coloration through firing in an air atmosphere, and accordingly no equipment is required for maintaining a reducing atmosphere, which is advantageous in terms of ease of use.

A ceramic product having a red decorative portion can be thus obtained as described above. The term "ceramic product" encompasses herein pottery, porcelain, earthenware, stoneware, glass and so forth. Specific articles include for instance tableware, decorative vessels, various wall and floor tiles, sanitary wares, roof tiles, bricks, clay pipes, ceramic pipes and the like.

The red decorative portion of the ceramic product is a fired body that contains at least glass, gold and silver. The red decorative portion of the present embodiment affords as a result a unique vivid red coloration. The appearance (color tone and gloss feeling) of this red decorative portion allows further enhancing the aesthetics and premium feel of the ceramic, and contributes to providing articles that accrue high customer satisfaction.

The color tone of the red decorative portion of the present embodiment in the L*a*b* color system according to JIS Z8729 (2004) can suitably satisfy the following conditions:

the L* value lies in the range of 35 to 70 (preferably 35 to 55);

the a* value is 20 or greater (preferably 30 or greater, and for instance 50 or smaller);

the b* value is 15 or greater (preferably 20 or greater, and for instance 40 or smaller).

A bright vivid tinge can be realized by prescribing the brightness L* value to be equal to or greater than a predetermined value. A deep warm tinge can be realized by prescribing the brightness L* value to be equal to or smaller than a predetermined value. Red color development can be increased, and a sharp crisp tinge can be realized, by prescribing the a* value in the red direction to be equal to or greater than a predetermined value. By prescribing the b* value in the yellow direction to be equal to or greater than a predetermined value, in other words by keeping small the −b* value blue direction, it becomes possible to realize vivid red coloration by suppressing purplish to bluish coloration, for instance as in "maroon" coloration.

The gloss feeling of the red decorative portion of the present embodiment involves 45-degree specular glossiness according to JIS Z8741 (1997), that can satisfy a value of 70% or higher, preferably 80% or higher, and particularly preferably 90% or higher. As a result the red decorative portion gives off glow when irradiated with light, which translates into in an enhanced gloss feeling. Further, the smoothness of the surface increases and a luxurious beautiful appearance can be achieved.

Examples pertaining to the technology disclosed herein will be explained next, but the invention is not meant to be limited to the examples below.

<I. Assessment of Color Tone>

In the present test example gold nanoparticles and silver nanoparticles were prepared as the red colorant, and color tone was assessed through modification of the content ratios of the gold nanoparticles and silver nanoparticles.

Specifically, firstly a dispersion (commercial product) of gold nanoparticles having a D50 particle size of 20 nm, a dispersion (commercial product) of silver nanoparticles having a D50 particle size of 20 nm and a dispersion (commercial product) of silica nanoparticles having a D50 particle size of 20 nm were mixed, to yield a first mixed solution. Next, glass frit (glass transition point: 640° C.) having the composition given in Table 1 was added to the first mixed solution, with further mixing of the whole, to thereby yield a second mixed solution. The second mixed solution was dried in an oven, and thereafter was subjected to a thermal treatment in an air atmosphere at a temperature of 800° C. to 900° C. for 30 minutes, to thereby yield a sintered compact. Each obtained sintered compact was disintegrated using an Ishikawa mixing and grinding machine, followed by pulverization using a vibration mill and a planetary mill, in this order, to produce a powdery red paint having an average particle size of 0.5 to 5 μm.

The first mixed solution and the second mixed solution were prepared so that, in the red paint state, glass was 80 vol %, silica as the protective material was 20 vol %, and the gold nanoparticles (Au) and silver nanoparticles (Ag), as the red colorant, were present in the proportion (parts by volume) given in Table 2 with respect to the total (100 parts by volume) of glass plus silica.

TABLE 1

Composition of glass frit

| | $SiO_2$ | CaO | SrO | BaO | $Li_2O$ | $Al_2O_3$ | ZnO | $ZrO_2$ | $SnO_2$ |
|---|---|---|---|---|---|---|---|---|---|
| (mol %) | 57 | 11 | 8 | 6 | 3 | 4 | 9 | 1 | 1 |

TABLE 2

Content ratio of red colorant and evaluation results

| | Content ratio of red colorant | | $L*a*b*$ color system: evaluation results | | | | |
|---|---|---|---|---|---|---|---|
| | Au (pts. vol.) | Ag (pts. vol.) | $L*$ value | Determination 1 | $a*$ value | $b*$ value | Determination 2 |
| Ref. ex. 1 | — | 0.11 | 85.0 | P | 1.1 | 25.0 | P |
| Ref. ex. 2 | — | 0.22 | 73.5 | P | 1.9 | 50.1 | P |
| Ref. ex. 3 | 0.28 | — | 40.5 | G | 46.3 | 4.8 | P |
| Ex. 1 | 0.60 | 0.45 | 30.2 | P | 43.3 | 34.9 | E |
| Ex. 2 | 0.05 | 0.09 | 66.2 | G | 20.5 | 18.3 | G |
| Ex. 3 | 0.11 | 0.05 | 58.1 | G | 32.9 | 15.8 | G |
| Ex. 4 | 0.11 | 0.11 | 52.2 | E | 33.8 | 24.3 | E |
| Ex. 5 | 0.22 | 0.16 | 42.9 | E | 41.4 | 28.3 | E |
| Ex. 6 | 0.28 | 0.11 | 43.9 | E | 46.3 | 25.8 | E |
| Ex. 7 | 0.28 | 0.22 | 39.6 | E | 46.9 | 35.3 | E |
| Ex. 8 | 0.32 | 0.32 | 37.6 | E | 46.4 | 37.3 | E |

Each produced red paint was applied to the surface of a ceramic (test piece), and decoration firing was performed at 700° C. to 900° C. in an air atmosphere (oxidizing atmosphere), to thereby yield a respective ceramic having a red decorative portion. Each red decorative portion was measured for brightness ($L*$) and chromaticity ($a*$, $b*$) in the $L*a*b*$ color system, according to JIS Z8729 (2004), using a spectrophotometer by Konica Minolta, Inc. The results are given in Table 2 in the corresponding columns.

The columns "Determination" in Table 2 shows determination results based on criteria (1) of Table 3. The column "Determination 1" in Table 2 sets out determination results of $L*$ value. The column "Determination 1" sets out the notation "E (Excellent)" where the $L*$ value is "⊗" (excellent), the notation "G (good)" where the $L*$ value is "○" (good), and the notation "P (Poor)" where the $L*$ value is "X" (poor). The determination results of chromaticity ($a*$, $b*$) are given in the column "Determination 2". The column "Determination 2" shows the notation "E (Excellent)" where both the $a*$ value and the $b*$ value are "⊗" (excellent), the notation "G (Good)" where one from among the $a*$ value and $b*$ value is "⊗" (excellent) and the other is "○" (Good), or where both the $a*$ value and $b*$ value are "○" (good), and shows the notation "P (Poor)" where at least one from among the $a*$ value and $b*$ value is "X" (poor).

TABLE 3

| | | Criteria (1) | | |
|---|---|---|---|---|
| | | X | ○ | ⊗ |
| Color tone | $L*$ value | Smaller than 35 or greater than 70 | 35 to 70 | 35 to 55 |
| | $a*$ value | Smaller than 20 | 20 or greater | 30 or greater |
| | $b*$ value | Smaller than 15 | 15 or greater | 20 or greater |

FIG. 2 is a matrix denoting the relationship between content ratio of red colorant and brightness and chromaticity in the $L*a*b*$ color system. As Table 2 and FIG. 2 illustrate, a red decorative portion of vivid coloration having good chromaticity ($a*$, $b*$) could be realized using the red colorants in Examples 1 to 8, containing gold nanoparticles and silver nanoparticles. Among the foregoing, brightness ($L*$) was enhanced and a bright vivid tinge could be better achieved through the use of the red paints in Examples 2 to 8, in which the proportion of gold nanoparticles and silver nanoparticles was 0.32 parts by volume or less with respect to the total of glass matrix plus protective material. In particular, bluishness was further suppressed and a red decorative portion boasting a notably crisp red coloration could be achieved through the use of the red paints of Examples 4 to 8, in which the proportion of gold nanoparticles and silver nanoparticles lay in the range of 0.11 to 0.32 parts by volume with respect to the total of glass matrix plus protective material.

<II. Assessment of Gloss Feeling>

In the present test example gold nanoparticles and silver nanoparticles were prepared as the red colorant, and color tone was assessed through modification of the content ratios of the gold nanoparticles and silver nanoparticles. Red paints were obtained in the same way as in the above I, but herein the red paints were prepared in such a manner that, in the state of the first mixed solution and the second mixed solution, the glass and the protective material were present in the proportions given in Table 4, and the content of gold nanoparticles as the red colorant was 0.3 parts by volume and the content of silver nanoparticles was 0.2 parts by volume, with respect to the total (100 parts by volume) of the glass plus silica. A respective red decorative portion was formed using each red paint, and "appearance (color tone and gloss feeling)" was measured.

The method for measuring color tone is the same as in the above I. Gloss feeling was measured in accordance with JIS Z8741 (1997) using a gloss meter manufactured by Nippon Denshoku Industries Co., Ltd. Table 5 sets out criteria for determining "Color tone" and "Glossiness", the determination results being given in the corresponding columns of Table 4. The criterion for color tone given in Table 5 is identical to the criterion "○" (Excellent) in Test example I.

Accordingly, instances where the criterion in the column of color tone in Table 4 is satisfied are shown as "E (Excellent)". Instances that fail to satisfy the criterion of Table 5 are noted with an asterisk (*) in the column of glossiness of Table 4. In the comprehensive determination of Table 4, instances where color tone was "E" and glossiness was 90% or higher were rated as "E (Excellent)", while instances where color tone was "E" and glossiness was 80% or higher were rated as "G (Good)".

TABLE 4

Proportion of glass, protective material and red colorant

|  |  | Ex. 9 | Ex. 10 | Ex. 11 | Ex. 12 | Ex. 13 | Ex. 14 |
|---|---|---|---|---|---|---|---|
| Glass (vol %) | | 95 | 90 | 80 | 70 | 60 | 50 |
| Protective material (vol %) | | 5 | 10 | 20 | 30 | 40 | 50 |
| Protective material/red colorant | | 10 | 20 | 40 | 60 | 80 | 100 |
| Appearance | Color tone | — | E | E | E | E | — |
| | Glossiness (%) | 91 | 93 | 92 | 87 | 83 | *32 |
| | Comprehensive determination | — | E | E | G | G | — |

TABLE 5

Criteria (2)

|  |  | Criteria |
|---|---|---|
| Color tone | L* value | 35 to 55 |
| | a* value | 30 or greater |
| | b* value | 20 or greater |
| Glossiness | | 70% or higher |

As Table 4 reveals, red decorative portions where color tone and glossiness were both particularly good could be achieved in Examples 10 to 13, in which the proportion of the protective material was 10 to 40 vol % with respect to 100 vol % as the total of the glass matrix and the protective material. Among the foregoing, a red decorative portion of particularly high gloss feeling, with a glossiness of 90% or higher, could be achieved using the red paints of Examples 10 and 11.

Concrete examples of the technology disclosed herein have been explained in detail above, but the concrete examples are merely illustrative in nature and are not meant to limit the scope of the claims in any way. The technology set forth in the claims includes variations and modifications of the concrete examples illustrated above.

The invention claimed is:

1. A red paint for ceramic decoration, comprising: a glass matrix; and a red colorant and a protective material that are intermingled in the glass matrix,
    wherein the red colorant contains gold nanoparticles and silver nanoparticles, and
    the protective material contains silica nanoparticles, and
    the volume of the protective material is 20 times or more the volume of the red colorant.

2. The red paint according to claim 1, wherein the proportion of the protective material is 10 vol % to 40 vol % with respect to 100 vol % as the total of the glass matrix and the protective material.

3. The red paint according to claim 2, wherein the volume ratio of the gold nanoparticles and the silver nanoparticles satisfies
    gold nanoparticles:silver nanoparticles=80:20 to 20:80.

4. The red paint according to claim 2, wherein the proportion of the gold nanoparticles is 0.05 parts by volume to 0.5 parts by volume with respect to 100 parts by volume as the total of the glass matrix and the protective material.

5. The red paint according to claim 2, wherein the proportion of the silver nanoparticles is 0.05 parts by volume to 0.4 parts by volume with respect to 100 parts by volume as the total of the glass matrix and the protective material.

6. The red paint according to claim 2, wherein an arithmetic mean of the sizes of the gold nanoparticles, silver nanoparticles, and silica nanoparticles sizes defines a value, wherein said value is a diameter of an equivalent circle, and wherein said diameter is between one and one hundred nanometers.

7. The red paint according to claim 6, wherein the sizes of the gold nanoparticles, silver nanoparticles, and silica nanoparticles are D50 sizes measured with electron microscopy.

8. The red paint according to claim 1, wherein the volume ratio of the gold nanoparticles and the silver nanoparticles satisfies
    gold nanoparticles:silver nanoparticles=80:20 to 20:80.

9. The red paint according to claim 1, wherein the proportion of the gold nanoparticles is 0.05 parts by volume to 0.5 parts by volume with respect to 100 parts by volume as the total of the glass matrix and the protective material.

10. The red paint according to claim 1, wherein the proportion of the silver nanoparticles is 0.05 parts by volume to 0.4 parts by volume with respect to 100 parts by volume as the total of the glass matrix and the protective material.

11. The red paint according to claim 1, wherein an arithmetic mean of the sizes of the gold nanoparticles, silver nanoparticles, and silica nanoparticles sizes defines a value, wherein said value is a diameter of an equivalent circle, and wherein said diameter is between one and one hundred nanometers.

12. The red paint according to claim 11, wherein the sizes of the gold nanoparticles, silver nanoparticles, and silica nanoparticles are D50 sizes measured with electron microscopy.

13. A red paint for ceramic decoration, comprising: a glass matrix; and a red colorant and a protective material that are intermingled in the glass matrix,
    wherein the red colorant contains gold nanoparticles and silver nanoparticles, and
    the protective material contains silica nanoparticles, and
    the proportion of the protective material is 10 vol % to 40 vol % with respect to 100 vol % as the total of the glass matrix and the protective material.

14. The red paint according to claim 13, wherein the volume ratio of the gold nanoparticles and the silver nanoparticles satisfies
    gold nanoparticles:silver nanoparticles=80:20 to 20:80.

15. The red paint according to claim 13, wherein the proportion of the gold nanoparticles is 0.05 parts by volume to 0.5 parts by volume with respect to 100 parts by volume as the total of the glass matrix and the protective material.

16. The red paint according to claim 13, wherein the proportion of the silver nanoparticles is 0.05 parts by volume to 0.4 parts by volume with respect to 100 parts by volume as the total of the glass matrix and the protective material.

17. The red paint according to claim 13, wherein an arithmetic mean of the sizes of the gold nanoparticles, silver nanoparticles, and silica nanoparticles sizes defines a value, wherein said value is a diameter of an equivalent circle, and wherein said diameter is between one and one hundred nanometers.

18. The red paint according to claim 17, wherein the sizes of the gold nanoparticles, silver nanoparticles, and silica nanoparticles are D50 sizes measured with electron microscopy.

\* \* \* \* \*